(12) United States Patent
Son et al.

(10) Patent No.: US 11,772,185 B2
(45) Date of Patent: Oct. 3, 2023

(54) ELECTRODE FOR RESISTANCE SPOT WELDING AND DEVICE FOR RESISTANCE SPOT WELDING INCLUDING THE SAME

(71) Applicants: HYUNDAI MOTOR COMPANY, Seoul (KR); KIA CORPORATION, Seoul (KR)

(72) Inventors: Seong Guk Son, Seoul (KR); Hyuck Min Kwon, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 184 days.

(21) Appl. No.: 17/380,829

(22) Filed: Jul. 20, 2021

(65) Prior Publication Data
US 2022/0203473 A1 Jun. 30, 2022

(30) Foreign Application Priority Data
Dec. 24, 2020 (KR) .......................... 10-2020-0183445

(51) Int. Cl.
*B23K 11/30* (2006.01)
*B23K 20/06* (2006.01)
(52) U.S. Cl.
CPC .............. *B23K 11/30* (2013.01); *B23K 20/06* (2013.01)

(58) Field of Classification Search
CPC .... B23K 11/30; B23K 20/06; B23K 11/3009; B23K 11/31; B23K 11/14; B23K 11/115
USPC ................................................. 219/86.32, 119
See application file for complete search history.

(56) References Cited

U.S. PATENT DOCUMENTS

| 4,902,869 A | * | 2/1990 | Wald ...................... B23K 11/115 219/86.32 |
| 2016/0059344 A1 | * | 3/2016 | Ito ........................ B23K 20/1235 228/2.1 |

FOREIGN PATENT DOCUMENTS

| JP | 3006079 U | 10/1994 |
| JP | 2016047549 A | 4/2016 |

* cited by examiner

*Primary Examiner* — Phuong T Nguyen
(74) *Attorney, Agent, or Firm* — LEMPIA SUMMERFIELD KATZ LLC

(57) ABSTRACT

An electrode and a device for resistance spot welding are capable of preventing an occurrence of a surface spatter by using magnetism. The electrode may include a shank and a welding tip mounted to an end of the shank. A magnetic unit is installed on an outer peripheral surface of the shank to form a magnetic field and to form a Lorentz force in a direction of rotation along a circumferential direction of the shank by the magnetic field and a current flowing through the shank.

8 Claims, 17 Drawing Sheets

-PRIOR ART-

-PRIOR ART-

FIG. 11A
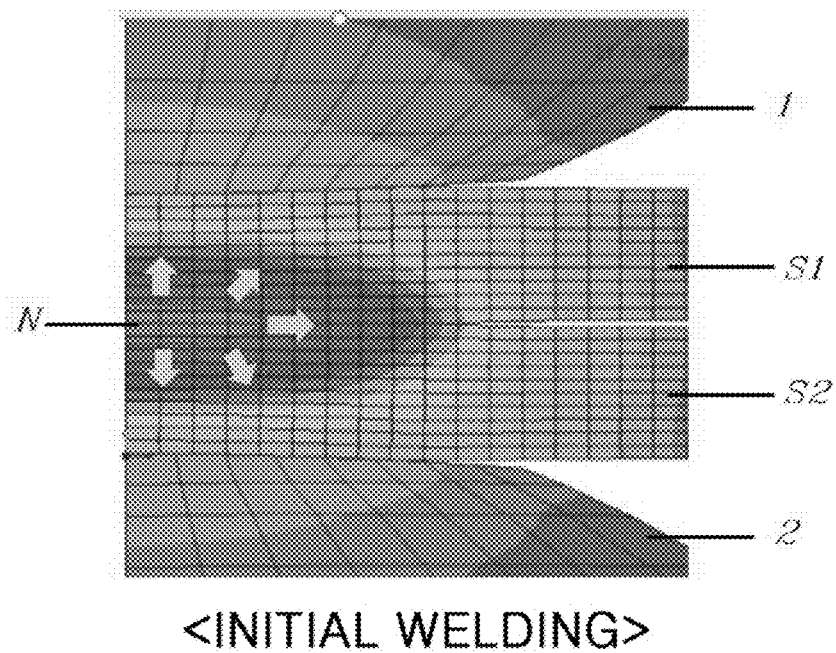
<INITIAL WELDING>
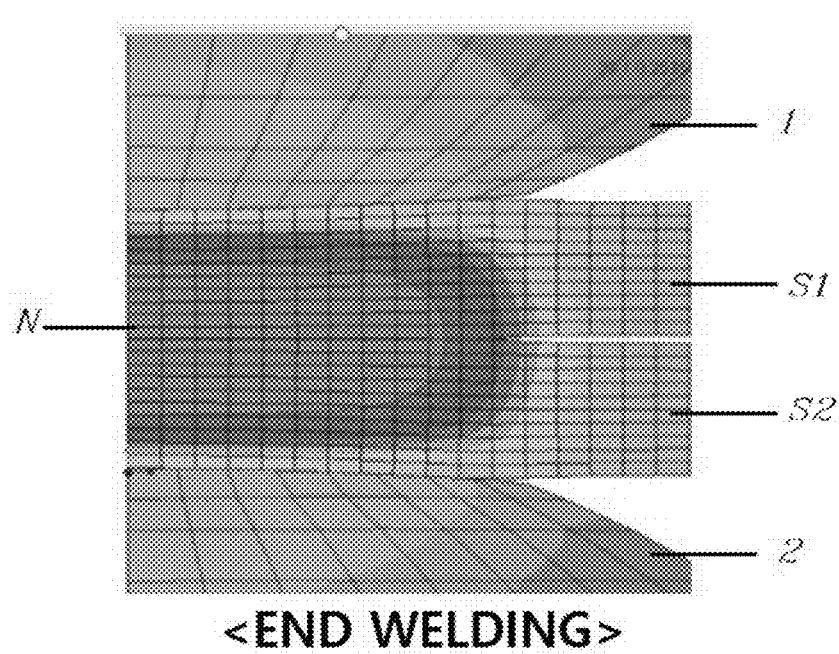
<END WELDING>

FIG. 11B
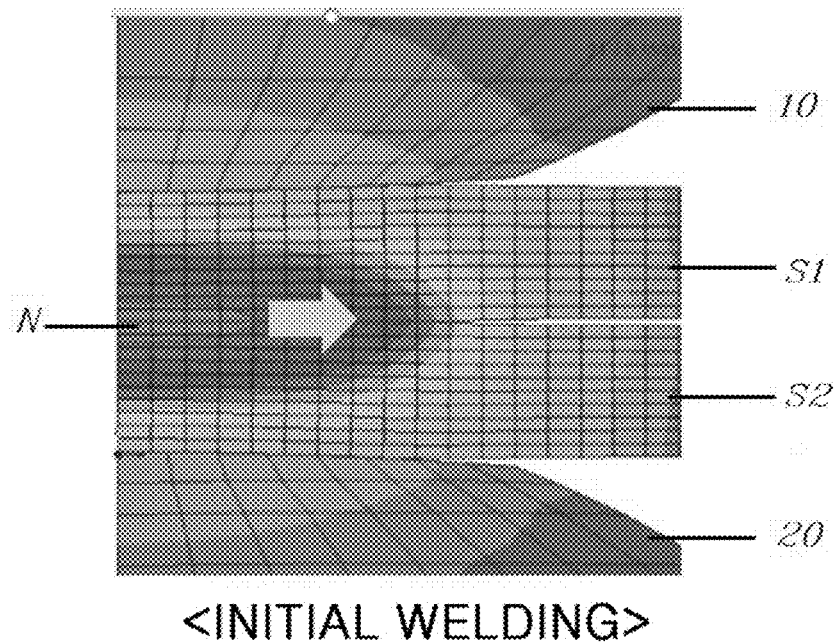
<INITIAL WELDING>
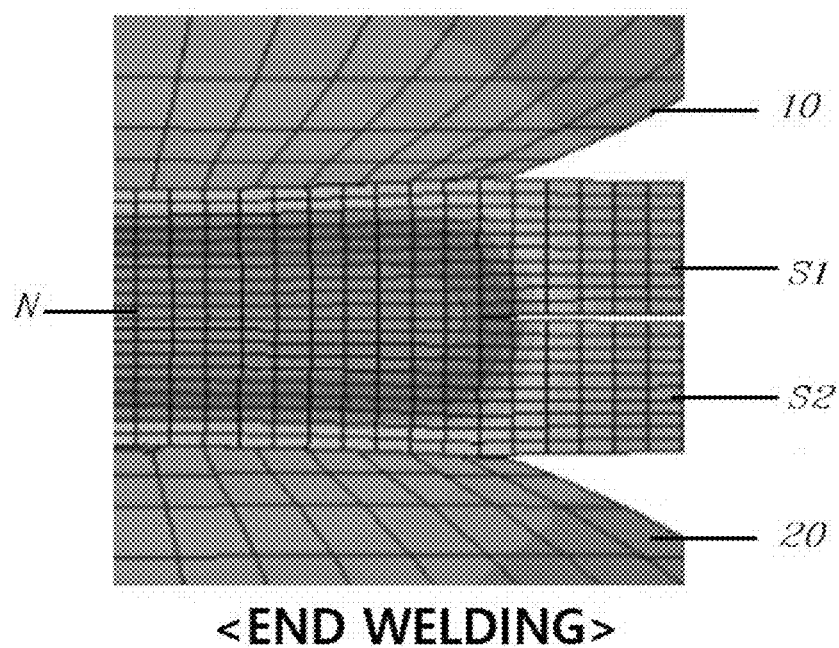
<END WELDING>

FIG. 12A
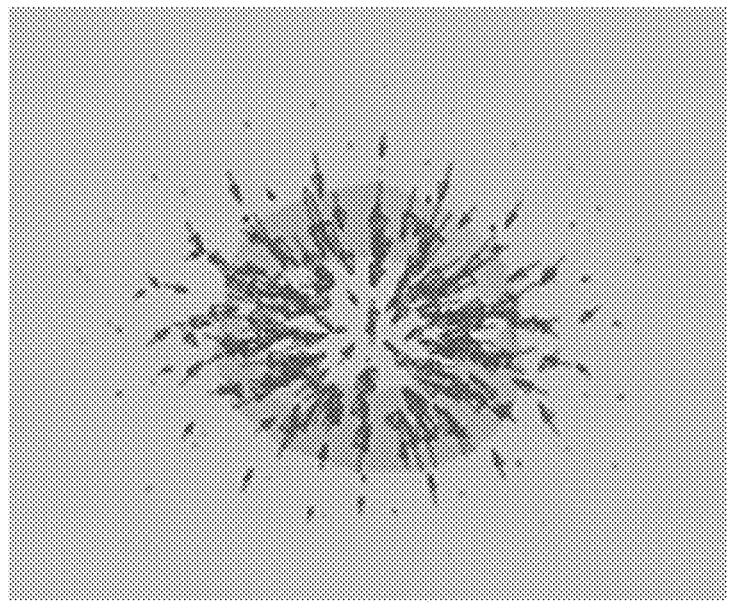
<LORENTZ FORCE>
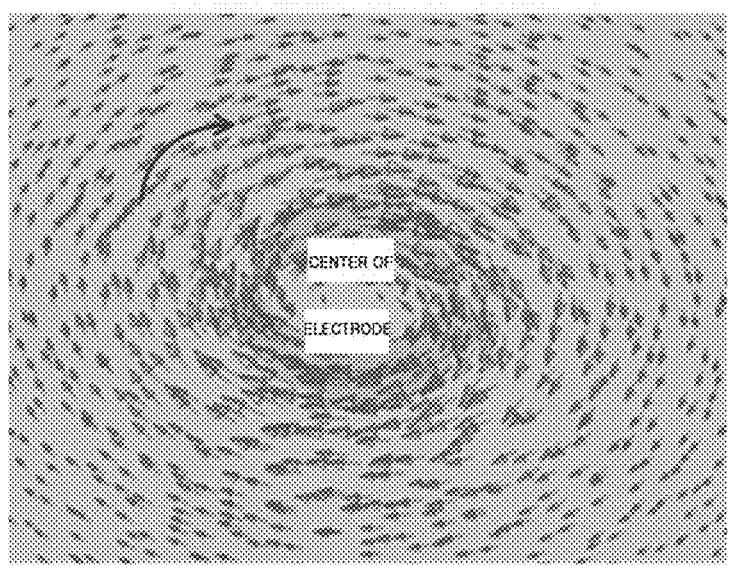
<DIRECTION OF MAGNETIC FIELD>

FIG. 12B
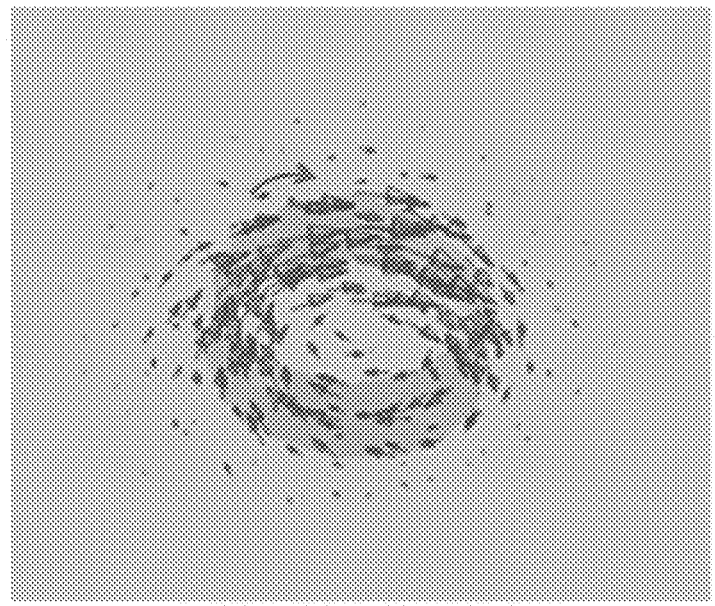
<LORENTZ FORCE>
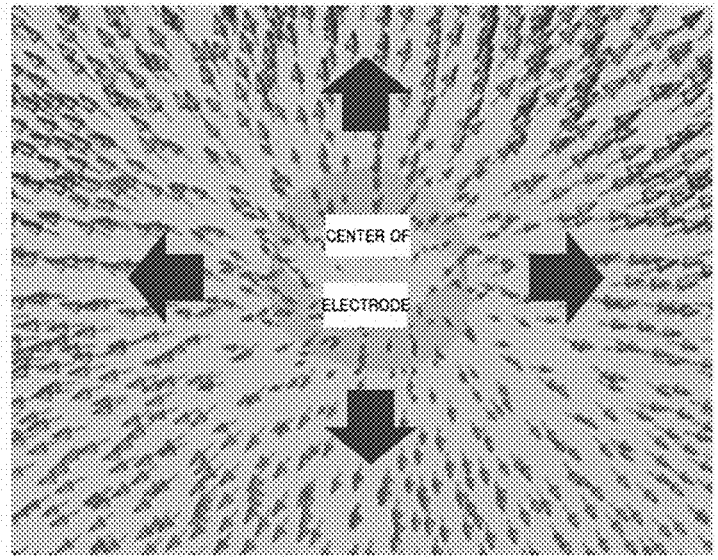
<DIRECTION OF MAGNETIC>

FIG. 13A
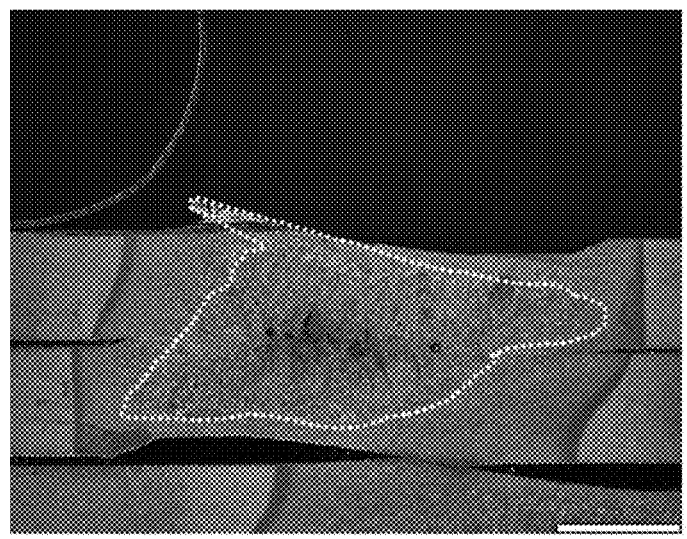

FIG. 13B
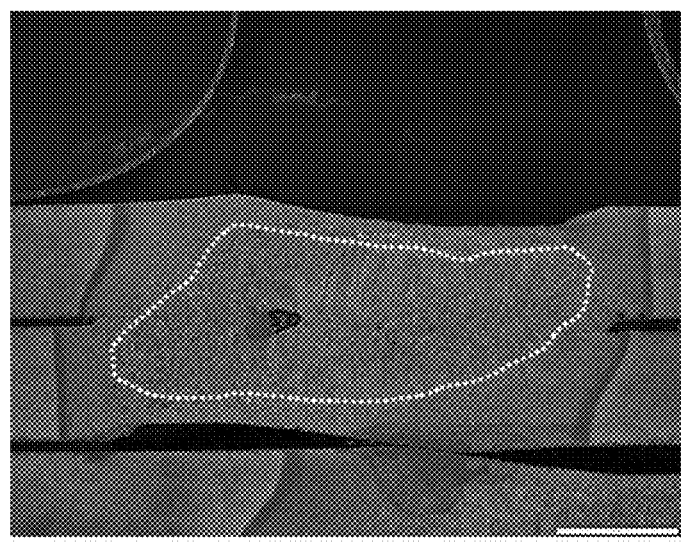
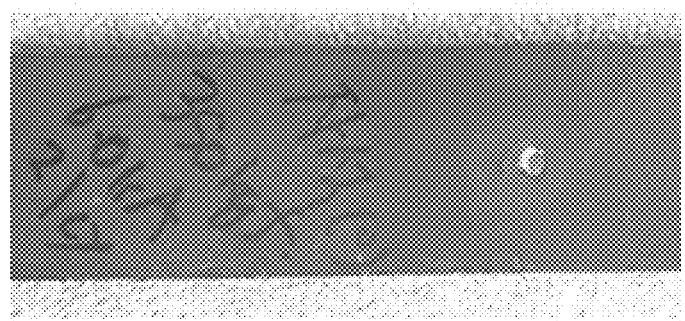

ELECTRODE FOR RESISTANCE SPOT WELDING AND DEVICE FOR RESISTANCE SPOT WELDING INCLUDING THE SAME

CROSS REFERENCE TO RELATED APPLICATION

The present application claims priority to Korean Patent Application No. 10-2020-0183445, filed Dec. 24, 2020, the entire contents of which are incorporated herein for all purposes by this reference.

BACKGROUND

1. Technical Field

The present disclosure relates to an electrode for resistance spot welding, and more particularly, to an electrode for resistance spot welding capable of preventing an occurrence of surface spatter by using magnetism, and to a device for resistance spot welding including the same.

2. Description of the Related Art

Resistance spot welding is a method of joining a pair of welding materials using resistive, resistance, or Ohmic heating, i.e., Joule heating, which produces heat generated by resistance at an interface of the welding materials by contacting an electrode with each of one side and the other side of the welding materials that touch each other and then applying a current thereto.

FIG. 1 is a diagram showing a configuration of a device for resistance spot welding according to the related art.

As may be seen from FIG. 1, the device for resistance spot welding according to the related art is depicted in a state in which a first welding material S1 and a second welding material S2 touch each other. An upper electrode 1 is in contact with an upper portion of the first welding material S1 disposed above and a lower electrode 2 is in contact with a lower portion of the second welding material S2 disposed below.

In addition, when a current is applied to the upper electrode 1 and the lower electrode 2, an interface between the first welding material S1 and the second welding material S2 is melted due to the heat generated by resistance at the interface, a nugget N is formed in a melting state and solidified again, and thus welding portions are formed and joined to each other.

Meanwhile, more recently, vehicle designs have been expanded to use an ultra-high-strength steel plate to reduce weight and improve collision performance. In such a high-strength steel sheet, a springback phenomenon occurs due to a high yield strength. There are problems in that the matching property of a welding portion deteriorates due to the springback phenomenon, and an amount of heat generated in a region where the nugget N is formed increases during welding due to a high material resistance.

When the amount of heat generated in the nugget N increases, the melted nugget N penetrates surfaces of the welding materials S1 and S2 and splashes to the outside. Thus, a spinate defect, i.e., a spatter, is formed.

Such a spatter is further generated when the welding materials S1 and S2 are respectively in contact with the electrodes 1 and 2 in an inclined state.

FIGS. 2A and 2B are diagrams showing results of analysis of a current density distribution and a temperature distribution in a spot welding portion when a spatter phenomenon occurs.

As may be seen in FIGS. 2A and 2B, when the welding materials S1 and S2 that touch each other and the electrodes 1 and 2 are in inclined contact with each other by 10 degrees or more, as a current density concentrates in a contact part of the upper electrode 1 and the first welding material S1, melting of the welding material expands to the corresponding area. As the nugget N in which the welding material is melted splashes to the corresponding area, there is a problem in that the surface spatter is formed.

Meanwhile, although the spatter is also generated at an interface between the first welding material S1 and the second welding material S2 as shown in FIG. 2B, because such an interface spatter is not exposed to the outside and contributes to joining the first welding material S1 and the second welding material S2, there is no problem.

The contents described as the related art have been provided only to assist in understanding the background of the present disclosure and should not be considered as corresponding to the related art known to those having ordinary skill in the art.

SUMMARY

An object of the present disclosure is to provide an electrode for resistance spot welding capable of preventing occurrence of a surface spatter by using magnetism, and to a device for resistance spot welding including the same.

According to an embodiment of the present disclosure, an electrode for resistance spot welding used in resistance spot welding is provided. The electrode may include a shank and a welding tip mounted to an end of the shank. A magnetic unit is installed on an outer peripheral surface of the shank to form a magnetic field and form a Lorentz force in a direction of rotation along a circumferential direction of the shank by the magnetic field and a current flowing through the shank.

The magnetic unit may include: an inner bracket in a pipe shape surrounding the outer peripheral surface of the shank; a magnetic body installed on an outer peripheral surface of the inner bracket to form the magnetic field; and an outer bracket installed on the outer peripheral surface of the shank while covering the inner bracket and the magnetic material.

A stopper protrusion in a ring shape may be formed on the outer peripheral surface of the shank. A plurality of fastening grooves to which bolts are fastened are formed in the stopper protrusion, a plurality of through holes communicating with the fastening grooves may be formed in the outer bracket, and bolts may penetrate the through holes and be fastened to the fastening grooves to fix the magnetic unit to the shank.

The magnetic body may be formed in a permanent magnet in a ring shape surrounding an outer peripheral surface of the inner bracket and may have an N pole and an S pole arranged in a longitudinal direction of the shank.

The magnetic unit may include a bracket formed in a pipe shape surrounding the outer peripheral surface of the shank and screwed to the outer peripheral surface of the shank and may include a magnetic body installed on an outer peripheral surface of the bracket to form the magnetic field.

A stopper protrusion in a ring shape may be formed on the outer peripheral surface of the shank. An outer thread may be formed from the stopper protrusion to an end of the shank and an inner thread screwed to the outer thread may be formed on an inner peripheral surface of the bracket.

The magnetic body may be formed in a permanent magnet in a ring shape surrounding an outer peripheral surface of the bracket and may have an N pole and an S pole arranged in a longitudinal direction of the shank.

According to another embodiment of the present disclosure, a device is provided for resistance spot welding that applies a current to a pair of welding materials touching each other and that welds the welding materials. The device includes: a first electrode and a second electrode disposed opposite to each other so as to be spaced apart from each other with respect to the welding materials; and a magnetic unit installed on at least one of the first electrode and the second electrode. The magnetic unit is spaced apart from an end of a selected electrode by a predetermined distance and installed on an outer peripheral surface of the electrode to form a magnetic field and form a Lorentz force in a direction of rotation along a circumferential direction of the electrode in the welding materials by the magnetic field and a current flowing through the electrode.

The magnetic unit may include a magnetic body formed in a permanent magnet in a ring shape surrounding an outer peripheral surface of the electrode and the magnetic body may have an N pole and an S pole arranged in a longitudinal direction of the electrode.

The first electrode and the second electrode may be spaced apart from each other in a vertical direction and are arranged in a straight line. The magnetic unit may be installed on an upper electrode among the first electrode and the second electrode.

The first electrode and the second electrode may be spaced apart from each other in a vertical direction and arranged in a straight line. The magnetic unit may be installed on the first electrode and the second electrode such that an N pole and an S pole of a magnetic body installed on the first electrode and an N pole and an S pole of a magnetic body installed on the second electrode are arranged to be symmetrical to each other.

The magnetic unit may be installed to be spaced from an end of the selected electrode by 30 mm to 50 mm.

BRIEF DESCRIPTION OF THE DRAWINGS

FIGS. 11A and 11B are analysis results showing a growth pattern of a nugget during resistance spot welding according to a comparative example and an embodiment of the present disclosure.

FIGS. 12A and 12B are analysis results showing the Lorentz force and a magnetic field direction during resistance spot welding according to a comparative example and an embodiment of the present disclosure.

FIGS. 13A and 13B are an enlarged photograph and a surface photograph of a welding portion after resistance spot welding according to a comparative example and an embodiment of the present disclosure.

DETAILED DESCRIPTION OF THE EMBODIMENTS

Figure 1:
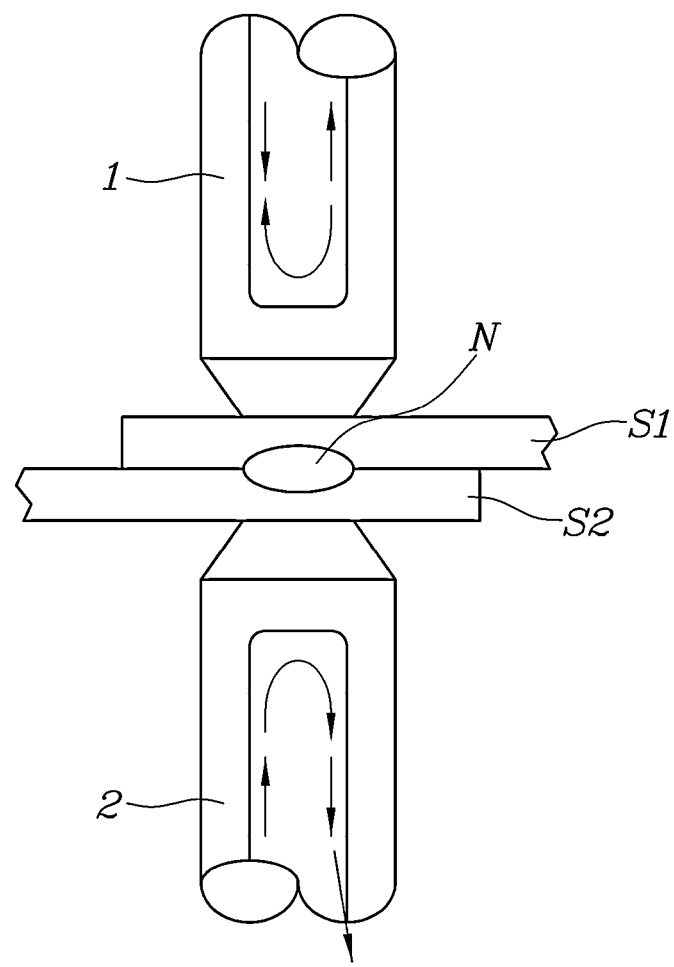
FIG. 1 is a diagram showing a configuration of a device for resistance spot welding according to the related art.

Hereinafter, embodiments of the present disclosure are described in more detail with reference to the accompanying drawings. However, the present disclosure is not limited to the embodiments disclosed below but may be implemented in a variety of different forms. The present embodiments are provided to make the disclosure of the present disclosure complete and to convey the scope of the disclosure to those having ordinary skill in the art. In the drawings, the same reference numerals refer to the same or equivalent elements.

Figure 3:
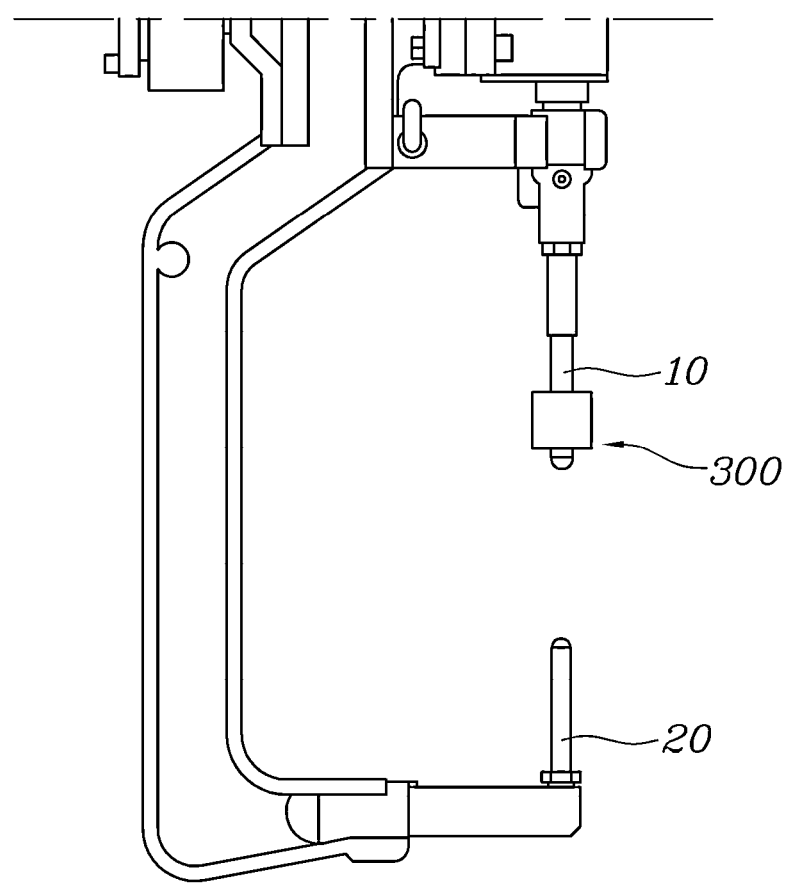
FIG. 3 is a diagram showing a configuration of a device for resistance spot welding according to an embodiment of the present disclosure.
Figure 4:
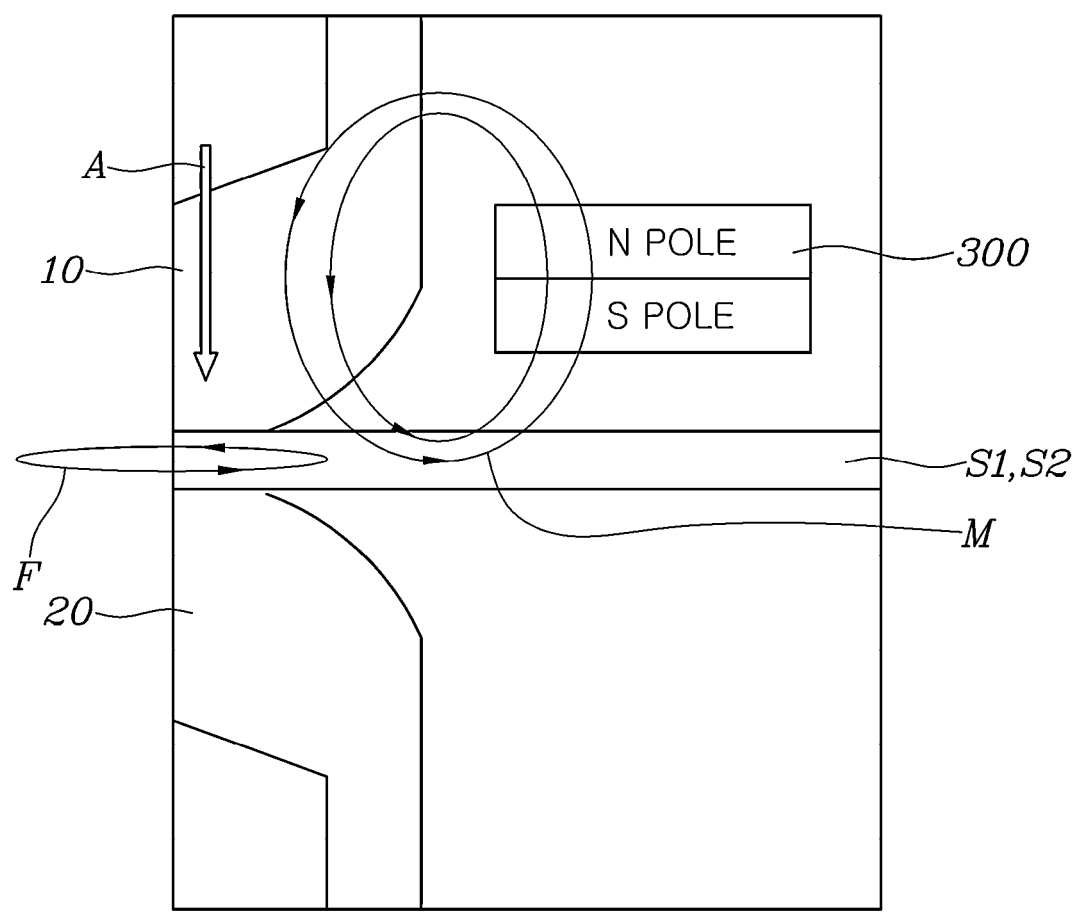
FIG. 4 is a diagram showing a direction in which a Lorentz force acts in a device for resistance spot welding according to an embodiment of the present disclosure.
Figure 5:
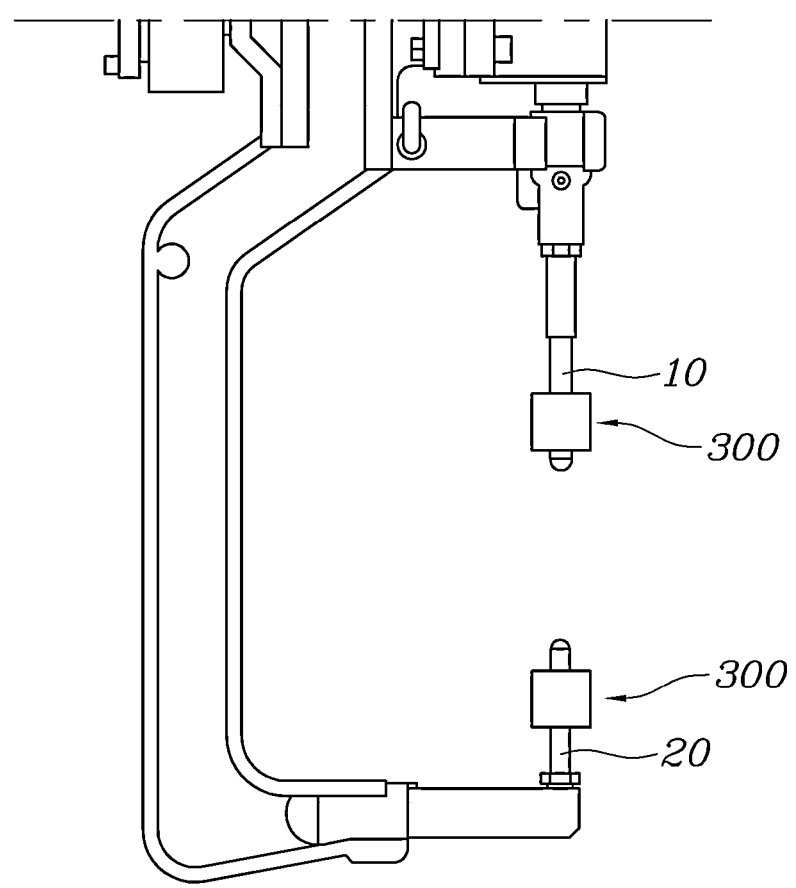
FIG. 5 is a diagram showing a configuration of a device for resistance spot welding according to another embodiment of the present disclosure.

FIG. 3 is a diagram showing a configuration of a device for resistance spot welding according to an embodiment of the present disclosure. FIG. 4 is a diagram showing a direction in which a Lorentz force acts in the device for resistance spot welding according to an embodiment of the present disclosure. FIG. 5 is a diagram showing a configuration of a device for resistance spot welding according to another embodiment of the present disclosure.

As shown in FIGS. 3 and 4, the device for resistance spot welding according to an embodiment of the present disclosure is a device for resistance spot welding that welds a pair of welding materials S1 and S2 that touch each other by applying a current to the pair of welding materials S1 and S2. The device includes the first electrode 10 and the second electrode 20 disposed opposite to each other so as to be spaced apart from each other with respect to the welding materials S1 and S2. The device also includes a magnetic unit 300 installed on at least one of the first electrode 10 and the second electrode 20.

The first electrode 10 and the second electrode 20 are spaced apart from each other in a vertical direction and are arranged in a straight line.

Thus, in a state in which the first welding material S1 disposed above and the second welding material S2 disposed below touch each other, the first electrode 10 is in contact with an upper portion of the first welding material S1 and the second electrode 20 is in contact with a lower portion of the second welding material S2.

In addition, the first electrode 10 and the second electrode 20 in one example are installed in a cylinder (not shown) moving up and down in the vertical direction. The cylinder moves up and down such that the first electrode 10 and the second electrode 20 are spaced apart from or in contact with the first welding material S1 and the second welding material S2, respectively. Although each of the first electrode 10 and the second electrode 20 may move and go down, one electrode may be fixedly installed and the other electrode may be installed to move up and down.

Figure 2A:
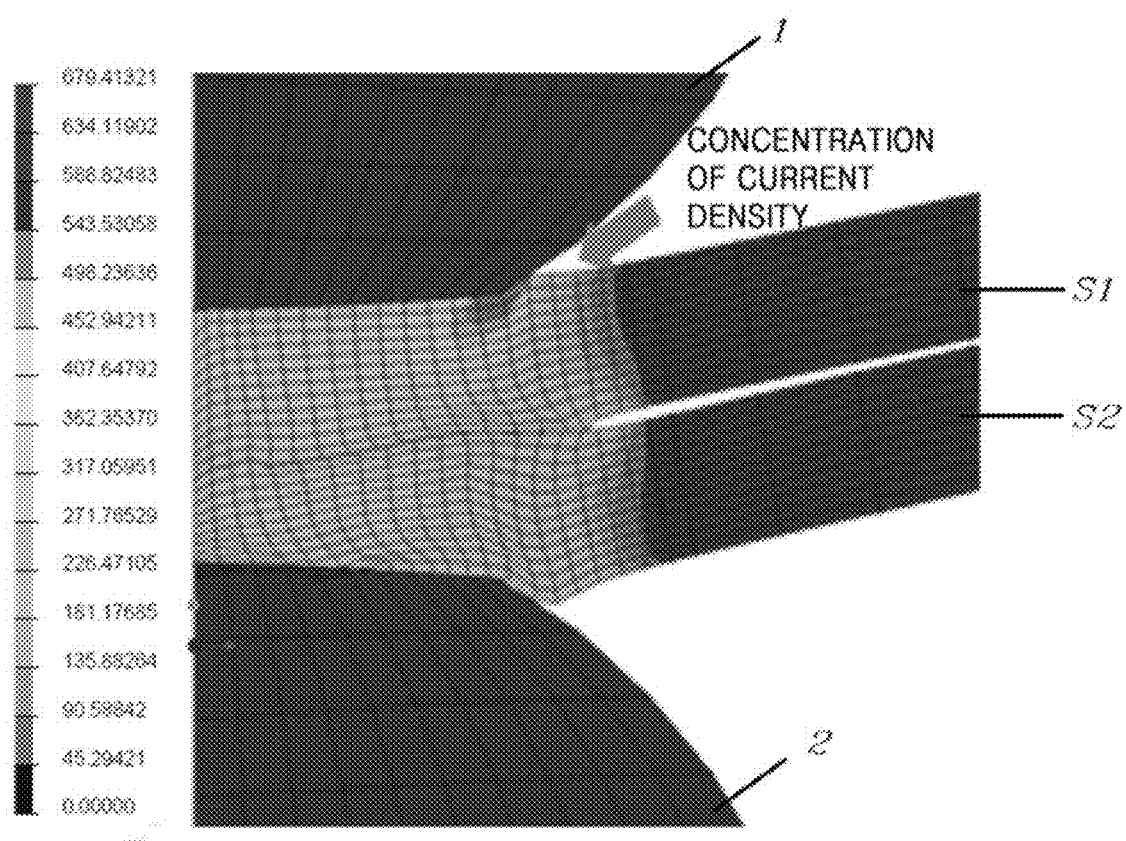
FIGS. 2A and 2B are diagrams showing results of analysis of a current density distribution and a temperature distribution in a spot welding portion when a spatter phenomenon occurs.
Figure 2B:
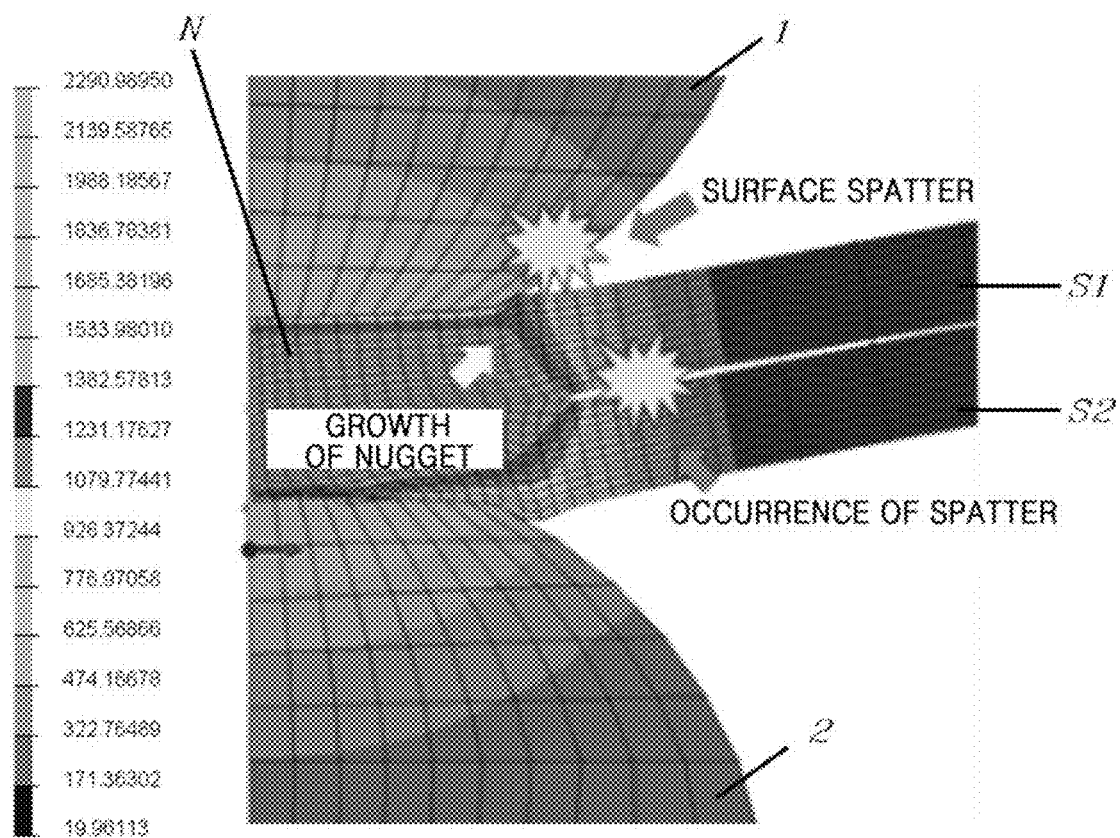

The magnetic unit 300 in one example is installed on the first electrode 10, which is an electrode disposed above the welding materials S1 and S2, as shown in FIGS. 3 and 4. The reason is to further impart the influence of a magnetic field generated by the magnetic unit 300 to a part where a spatter phenomenon occurs. This is because, as shown in FIG. 2B, in general, the spatter phenomenon tends to occur at the contact part between the first electrode 10 and the welding material S1 that are disposed above each other.

The magnetic unit 300 is a unit that is spaced apart from an end of the first electrode 10 by a predetermined distance and that is installed on an outer peripheral surface of the first electrode 10, forms the magnetic field, and forms the Lorentz force in a direction of rotation along a circumferential direction of the first electrode 10 in the welding materials S1 and S2 by the magnetic field and a current flowing through the first electrode 10.

Accordingly, the magnetic unit 300 includes a magnetic body 320 formed as a permanent magnet.

The magnetic body 320 in one example is formed in a ring shape so as to surround the outer peripheral surface of the first electrode 10. In particular, in one example the magnetic body 320 has an N pole and an S pole disposed in a longitudinal direction of the first electrode 10.

In addition, as shown in FIG. 4, when the current flows from the first electrode 10 to the second electrode 20, while the magnetic field is generated from the N pole to the S pole of the magnetic body 320 disposed around the first electrode 10, a magnetic field direction is formed from the center of the first welding material S1 in contact with the first electrode 10 to an outside direction, according to Fleming's left-hand law. The Lorentz force is formed in the direction of rotation along the circumferential direction of the electrodes 10 and 20 in the welding materials S1 and S2.

Upon welding by the Lorentz force formed as described above, the nugget N is formed in a melting state at the interface between the first welding material S1 and the second welding material S2. The Lorentz force acts on the nugget N such that the nugget N grows in a transverse direction. As the nugget N grows in the transverse direction, the nugget N in the melting state is suppressed from splashing to the surfaces of the first welding material S1 and the second welding material S2.

Meanwhile, in the present disclosure, the magnetic unit 300 is not limited to being installed on the first electrode 10. As shown in FIG. 5, the magnetic unit 300 may be installed on both the first electrode 10 and the second electrode 20.

In one example, the N and S poles of the magnetic body 320 installed on the first electrode 10 and the N and S poles of the magnetic body 320 installed on the second electrode 20 are disposed to be symmetrical to each other.

Therefore, directions of the magnetic fields generated at the N and S poles of the magnetic body 320 installed on the first electrode 10 and the magnetic body 320 installed on the second electrode 20 may be not canceled from each other in a welding material but may overlap to increase the strength of the magnetic field.

Next, an electrode used as the first electrode 10 or the second electrode 20 is described in more detail. Hereinafter, in order to avoid redundant descriptions, the first electrode 10 is described.

Figure 6:
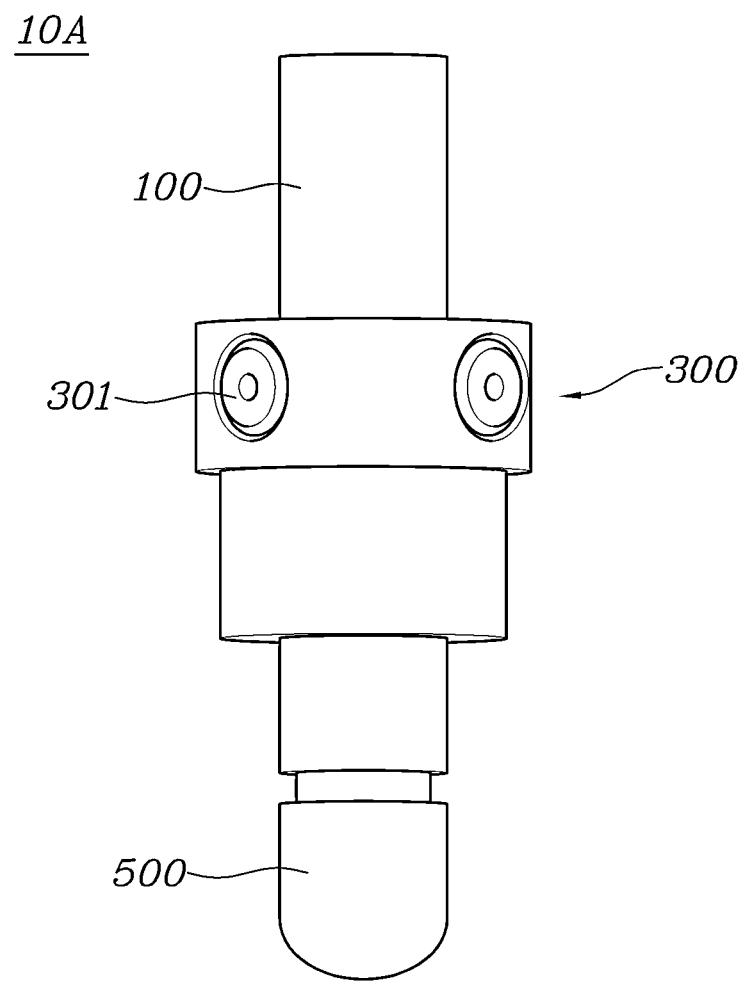
FIG. 6 is a diagram showing an electrode for resistance spot welding according to an embodiment of the present disclosure.
Figure 7:
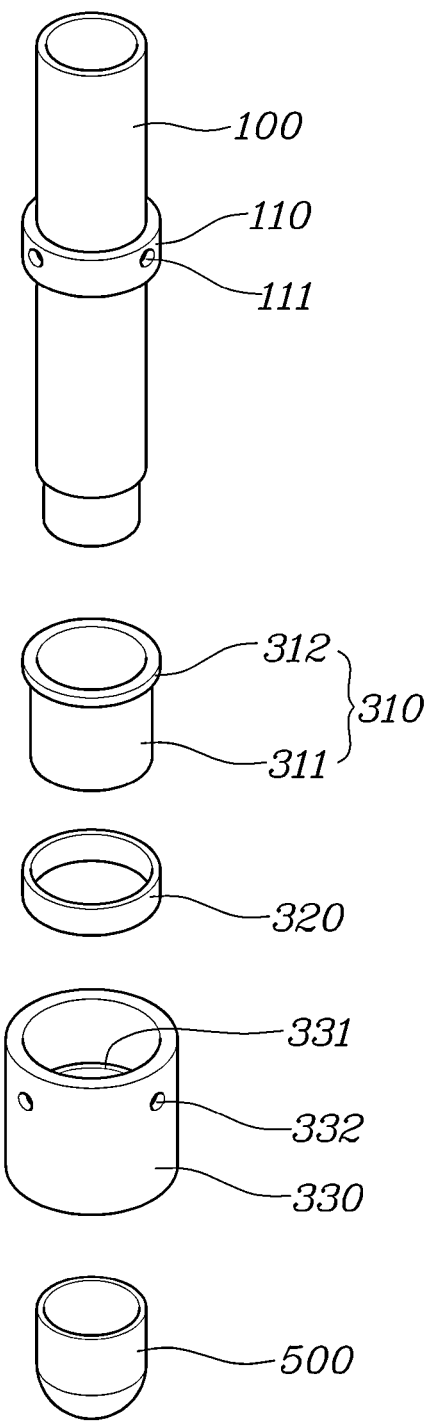
FIG. 7 is an exploded perspective view showing an electrode for resistance spot welding according to an embodiment of the present disclosure.
Figure 8:
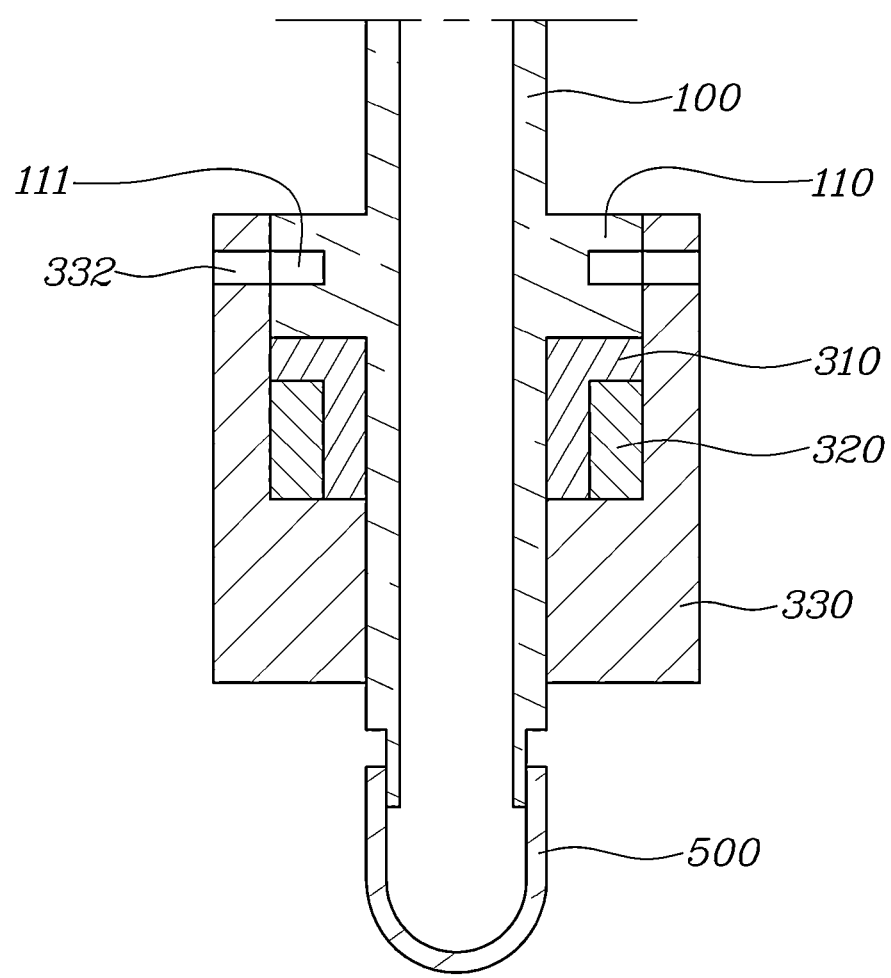
FIG. 8 is a cross-sectional view showing an electrode for resistance spot welding according to an embodiment of the present disclosure.

FIG. 6 is a diagram showing an electrode for resistance spot welding according to an embodiment of the present disclosure. FIG. 7 is an exploded perspective view showing the electrode for resistance spot welding according to an embodiment of the present disclosure. FIG. 8 is a cross-sectional view showing the electrode for resistance spot welding according to an embodiment of the present disclosure.

As shown in FIGS. 6-8, an electrode 10A for resistance spot welding according to an embodiment of the present disclosure includes a shank 100; a welding tip 500 mounted on an end of the shank 100; and the magnetic unit 300 mounted on an outer peripheral surface of the shank 100.

The shank 100 is a component in a pipe shape through which cooling water flows therein.

The welding tip 500 is mounted on the end of the shank 100 and is formed of a conductive material so that a current supplied from the outside may be applied.

The shank 100 and the welding tip 500 may be used by variously changing electrodes applied to a general device for resistance spot welding.

Meanwhile, in the shank 100, a stopper protrusion 110 in a ring shape is formed on the outer peripheral surface to install the magnetic unit 300.

In addition, a plurality of fastening grooves 111, to which bolts 301 may be fastened, are spaced apart from each other in a circumferential direction and are formed in the stopper protrusion 110.

Meanwhile, the magnetic unit 300 is a unit mounted on the outer peripheral surface of the shank 100 to form a magnetic field and to form the Lorentz force in a direction of rotation along a circumferential direction of the shank 100 by the magnetic field and a current flowing through the shank 100.

Therefore, the magnetic unit 300 includes the magnetic body 320 formed in a permanent magnet in a ring shape surrounding the outer peripheral surface of the shank 100. The magnetic unit 300 also includes a means for fixing the magnetic body 320 to the shank 100.

In addition, the magnetic unit 300 includes: an inner bracket 310 in a pipe shape surrounding the outer peripheral surface of the shank 100; the magnetic body 320 mounted on an outer peripheral surface of the inner bracket 310 to form a magnetic field; and an outer bracket 330 mounted on the outer peripheral surface of the shank 100 while covering the inner bracket 310 and the magnetic body 320.

The inner bracket 310 is a means for separating the magnetic body 320 from the shank 100 and is formed of an insulating material having a predetermined thickness.

In order to easily install the magnetic body 320 on the outer peripheral surface of the inner bracket 310, the inner bracket 310 is divided into a body portion 311 in a pipe shape and a stopper portion 312 protruding in a ring shape by a thickness of the magnetic body 320 from an upper end of the body portion 311.

Thus, the magnetic body 320 is inserted from a lower portion of the body portion 311, in an upward direction, so that the upper end of the magnetic body 320 is in contact with the stopper portion 312 and a position thereof is fixed.

In one example, the magnetic body 320 is formed in the ring shape so as to surround the outer peripheral surface of the inner bracket 310 as described above and has an N pole and an S pole disposed in a longitudinal direction of the first electrode 10.

The outer bracket 330 is formed in the pipe shape so as to be mounted on the outer peripheral surface of the shank 100 while covering the inner bracket 310 and the magnetic body 320.

At this time, a plurality of through holes 332, communicating with fastening grooves 111 formed in the shank 100, are formed in an upper end of the outer bracket 330. Thus, the bolts 301 penetrate the through holes 332 and are fastened to the fastening grooves 111 so that the magnetic unit 300 is fixed to the shank 100.

In addition, a stepped portion 331, on which the inner bracket 310 and the magnetic body 320 are seated, is formed on an inner circumferential surface of the outer bracket 330. When lower ends of the inner bracket 310 and the magnetic body 320 are identical, the stepped portion 331 may be formed in a single step. When the inner bracket 310 and the lower end of the magnetic body are not identical, the stepped portion 331 may be formed in two steps so that the lower ends of the inner bracket 310 and the magnetic body 320 may be respectively seated.

Meanwhile, a structure of a shank and a structure of a magnetic unit may change in order to change a method of fixing a magnetic material to the shank.

Figure 9:
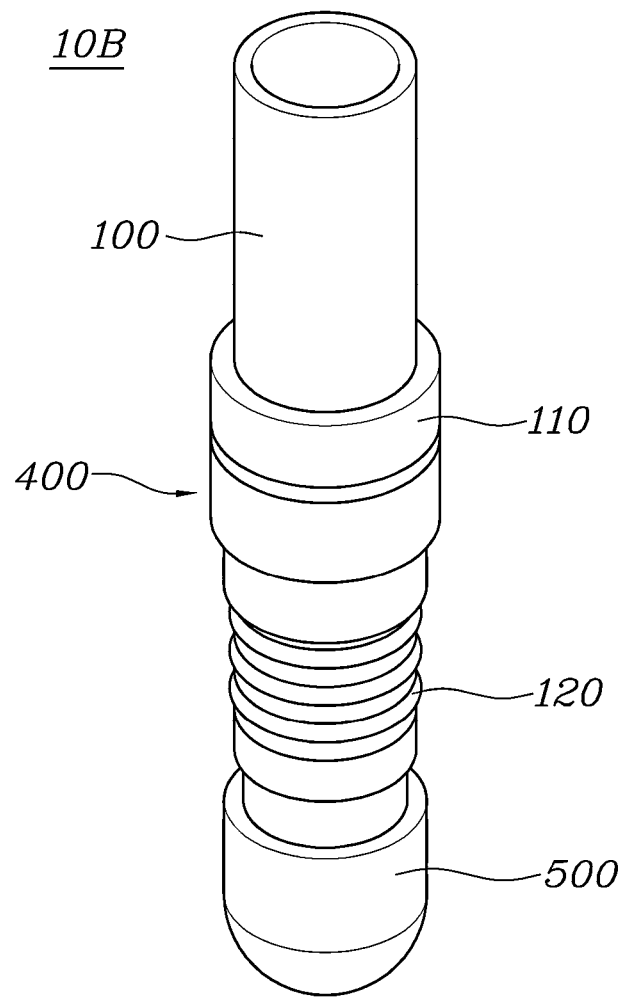
FIG. 9 is a diagram showing an electrode for resistance spot welding according to another embodiment of the present disclosure.
Figure 10:
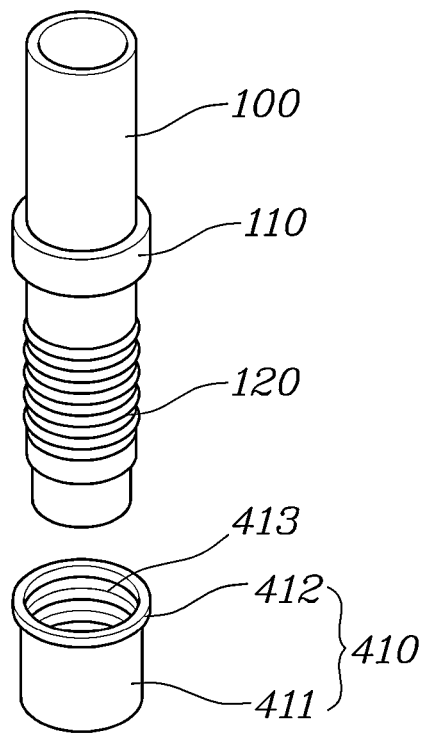
FIG. 10 is an exploded perspective view showing an electrode for resistance spot welding according to another embodiment of the present disclosure.

FIG. 9 is a diagram showing an electrode for resistance spot welding according to another embodiment of the present disclosure. FIG. 10 is an exploded perspective view showing an electrode for resistance spot welding according to another embodiment of the present disclosure.

As shown in FIGS. 9 and 10, an electrode 10B for resistance spot welding according to another embodiment of the present disclosure includes: the shank 100; the welding tip 500 mounted on an end of the shank 100; and a magnetic unit 400 mounted on an outer peripheral surface of the shank 100 as in the above-described embodiment.

The stopper protrusion 110 in a ring shape is formed on the outer peripheral surface of the shank 100 to install the magnetic unit 400.

Further, an outer thread 120 is formed on the outer peripheral surface of the shank 100 from the stopper protrusion 110 to the end of the shank 100.

In addition, the magnetic unit 400 includes the magnetic body 320 formed in a permanent magnet in a ring shape surrounding the outer peripheral surface of the shank 100 and includes a means for fixing the magnetic body 320 to the shank 100.

In addition, the magnetic unit 400 includes: a bracket 410 in a pipe shape surrounding the outer peripheral surface of the shank 100 and screwed to the outer peripheral surface of the shank 100; and the magnetic body 320 mounted on the outer peripheral surface of the bracket 410 to form a magnetic field.

The bracket 410 is a means for fixing the magnetic body 320 while separating the magnetic body 320 from the shank 100. The bracket 410 is formed of an insulating material having a predetermined thickness.

The bracket 410 includes a body portion 411 in a pipe shape and a stopper portion 412 protruding in a ring shape by a thickness of the magnetic body 320 from an upper end of the body portion 411 in order to easily install the magnetic body 320 on the outer peripheral surface of the bracket 410.

An inner thread 413 screwed to the outer thread 120 formed in the shank 100 is formed in the inner peripheral surface of the bracket 410.

Thus, the bracket 410 is mounted by being screwed to the shank 100.

Further, the magnetic body 320 is fixed to the outer peripheral surface of the bracket 410. The magnetic body 320 may be adhered and fixed to the outer peripheral surface of the bracket 410 by a separate adhesive means or may be pressed and fixed to the outer peripheral surface of the bracket 410.

Meanwhile, in one example the magnetic units 300 and 400 according to the above-described and other embodiments are installed to be spaced from the end of the first electrode 10 by a predetermined distance. For example, the magnetic units 300 and 400 are installed to be spaced from the end of the first electrode 10 by 30 mm to 50 mm. The reason is that a direction of the magnetic field generated by the magnetic units 300 and 400 is formed from the center of the welding materials S1 and S2 to an outside direction.

Next, welding using a device for resistance spot welding according to the related art and welding using a device for resistance spot welding according to the present disclosure are compared.

Both the device for resistance spot welding according to the related art as a comparative example and the device for resistance spot welding according to the present disclosure as an embodiment include both the shank 100 and the welding tip 500. However, there is a difference in that, in the comparative example, the magnetic unit 300 is not mounted, and in the disclosed embodiment, the magnetic unit 300 is mounted.

First, FIGS. 11A and 11B are analysis results showing a growth pattern of a nugget during resistance spot welding according to a comparative example and an example according to the present disclosure, respectively.

In a case of resistance spot welding of the first welding material S1 and the second welding material S2 using the comparative example and the embodiment as shown in FIGS. 11A and 11B, in the comparative example and the disclosed embodiment, the nugget N is formed in a molten state at an interface between the first welding material S1 and the second welding material S2.

However, in the case of the comparative example, it is confirmed that the nugget N uniformly grows radially as shown in FIG. 11A.

Meanwhile, in the case of the disclosed embodiment, it is confirmed that the nugget N grows mainly in a transverse direction as shown in FIG. 11B.

Accordingly, in the case of the disclosed embodiment, an effect of preventing an occurrence of a surface spatter and an effect of suppressing a penetration depth may be expected.

Next, the reason for the above results is analyzed.

FIGS. 12A and 12B are analysis results showing the Lorentz force and a magnetic field direction during resistance spot welding according to a comparative example and an embodiment of the present disclosure, respectively.

As may be seen from FIG. 12A, in the case of the comparative example, a magnetic field is not formed by the magnetic unit 300. Accordingly, only a magnetic field is formed by a current applied during welding. With respect to a relationship between the current and the magnetic field, the magnetic field is formed in a direction of rotation along a circumferential direction of the electrodes 1 and 2 which is a direction perpendicular to a current direction according to the law of clockwise screw.

Thus, forces generated in the comparative example cancel each other according to directions of the current and the magnetic field so that there is substantially little influence of the Lorentz force. As described above, because there is little influence of the Lorentz force, the nugget N grows radially and uniformly as shown in FIG. 11A.

Meanwhile, as may be seen in FIG. 12B, in the case of the disclosed embodiment, the magnetic field is formed by the magnetic unit 300. Accordingly, as a result of the current applied during welding and a direction of the magnetic field by the magnetic unit 300, in the disclosed embodiment, the Lorentz force is formed in the direction of rotation along the circumferential direction of the electrodes 10 and 20. Because of the influence of the Lorentz force, the melted nugget N grows mainly in a transverse direction, similar to receiving a centrifugal force.

Next, a cross section and a surface of a resultant weld using a device for resistance spot welding according to the related art and a device for resistance spot welding according to the present disclosure are observed.

FIGS. 13A and 13B are an enlarged photograph and a surface photograph of a welding portion after resistance spot welding according to a comparative example and according to a disclosed embodiment, respectively.

As may be seen from FIG. 13a, in the case of the comparative example, it is confirmed that a nugget size is 5.12 mm, and a surface spatter is generated.

Meanwhile, as may be seen from FIG. 13B, in the case of the disclosed embodiment, it is confirmed that the nugget size is 6.75 mm, and no surface spatter is generated.

Therefore, according to the disclosed embodiment, it is confirmed that the nugget size may increase and an occurrence of the surface spatter may be suppressed.

According to an embodiment of the present disclosure, a permanent magnet is disposed on an outer peripheral surface of an electrode, and a nugget in a molten state formed during welding grows in a transverse direction using the Lorentz force formed by a current applied to the electrode and a magnetic field formed by the permanent magnet. The nugget in the molten state is thereby prevented from splashing to the outside of a welding material. Accordingly, it is possible to suppress an occurrence of a spatter phenomenon during welding.

In addition, a growth direction and a size of the nugget may be adjusted by setting a position, strength, and direction of a polarity of the permanent magnet, thereby controlling a shape of a welding portion.

The effects obtained by the present disclosure are not limited to the effects mentioned above, and other effects that are not mentioned may be clearly understood by those having ordinary skill in the art from the following description.

Although the present disclosure has been shown and described with respect to specific embodiments, it should be apparent to those having ordinary skill in the art that the present disclosure may be variously modified and altered without departing from the spirit and scope of the present disclosure as defined by the following claims.

What is claimed is:

1. An electrode for resistance spot welding used in resistance spot welding, the electrode comprising:
   a shank;
   a welding tip mounted to an end of the shank; and
   a magnetic unit installed on an outer peripheral surface of the shank to form a magnetic field and to form a Lorentz force in a direction of rotation along a circumferential direction of the shank by the magnetic field and a current flowing through the shank,
   wherein the magnetic unit includes
   an inner bracket in a pipe shape surrounding the outer peripheral surface of the shank,
   a magnetic body installed on an outer peripheral surface of the inner bracket to form the magnetic field, and
   an outer bracket installed on the outer peripheral surface of the shank while covering the inner bracket and the magnetic material.

2. The electrode of claim 1,
   wherein a stopper protrusion in a ring shape is formed on the outer peripheral surface of the shank, and a plurality of fastening grooves to which bolts are fastened are formed in the stopper protrusion,
   wherein a plurality of through holes communicating with the fastening grooves are formed in the outer bracket, and
   wherein bolts penetrate the through holes and are fastened to the fastening grooves to fix the magnetic unit to the shank.

3. The electrode of claim 1, wherein the magnetic body is formed in a permanent magnet in a ring shape surrounding an outer peripheral surface of the inner bracket and has an N pole and an S pole arranged in a longitudinal direction of the shank.

4. A device for resistance spot welding that applies a current to a pair of welding materials touching each other and that welds the welding materials, the device comprising:
   a first electrode and a second electrode disposed opposite to each other so as to be spaced apart from each other with respect to the welding materials; and
   a magnetic unit installed on at least one of the first electrode and the second electrode,
   wherein the magnetic unit is spaced apart from an end of a selected electrode by a predetermined distance and is installed on an outer peripheral surface of the electrode to form a magnetic field and to form a Lorentz force in a direction of rotation along a circumferential direction of the electrode in the welding materials by the magnetic field and a current flowing through the electrode, and
   wherein the magnetic unit includes
   an inner bracket in a pipe shape surrounding the outer peripheral surface of the first electrode or the second electrode,
   a magnetic body formed in a permanent magnet in a ring shape surrounding an outer peripheral surface of the first electrode or the second electrode to form the magnetic field, and
   an outer bracket installed on the outer peripheral surface of the first electrode or the second electrode while covering the inner bracket and the magnetic material.

5. The device of claim 4, wherein the magnetic body has an N pole and an S pole arranged in a longitudinal direction of the electrode.

6. The device of claim 5,
   wherein the first electrode and the second electrode are spaced apart from each other in a vertical direction and are arranged in a straight line, and
   wherein the magnetic unit is installed on the first electrode positioned higher than the second electrode.

7. The device of claim 5,
   wherein the first electrode and the second electrode are spaced apart from each other in a vertical direction and are arranged in a straight line, and
   wherein the magnetic unit is installed on the first electrode and the second electrode such that an N pole and an S pole of a magnetic body installed on the first electrode and an N pole and an S pole of a magnetic body installed on the second electrode are arranged to be symmetrical to each other.

8. The device of claim 4, wherein the magnetic unit is installed to be spaced from an end of the selected electrode by 30 mm to 50 mm.

* * * * *